United States Patent
Gu et al.

(10) Patent No.: US 10,570,908 B2
(45) Date of Patent: Feb. 25, 2020

(54) CENTRIFUGAL COMPRESSOR ASSEMBLY AND METHOD OF OPERATION WITH AN AIRCONDITIONER

(71) Applicant: Hangzhou Stellar Mechanical & Electrical Technology, Inc., Zhejiang (CN)

(72) Inventors: Fahua Gu, San Diego, CA (US); Peng Yuan, Zhejiang (CN); Jiejie Song, Zhejiang (CN); Weixing Ji, Zhejiang (CN)

( * ) Notice: Subject to any disclaimer, the term of this patent is extended or adjusted under 35 U.S.C. 154(b) by 251 days.

(21) Appl. No.: 15/267,791

(22) Filed: Sep. 16, 2016

(65) Prior Publication Data

US 2017/0370364 A1  Dec. 28, 2017

(30) Foreign Application Priority Data

Jun. 28, 2016  (CN) .......................... 2016 1 0518668

(51) Int. Cl.
*F04D 25/06*  (2006.01)
*F16C 32/06*  (2006.01)
(Continued)

(52) U.S. Cl.
CPC ........... *F04D 25/06* (2013.01); *F04D 17/122* (2013.01); *F04D 29/051* (2013.01); *F04D 29/056* (2013.01); *F04D 29/057* (2013.01); *F04D 29/0513* (2013.01); *F04D 29/063* (2013.01); *F04D 29/286* (2013.01); *F04D 29/4206* (2013.01); *F04D 29/5806* (2013.01);
(Continued)

(58) Field of Classification Search
CPC .... F04D 25/06; F04D 17/122; F04D 29/5806; F04D 29/286; F04D 29/051; F04D 29/063; F04D 29/4206; F04D 29/056; F16C 37/00; F16C 37/002; F16C 33/1065; F16C 33/128
See application file for complete search history.

(56) References Cited

U.S. PATENT DOCUMENTS

| 307,625 A | * | 11/1884 | Borchardt | ............... F16C 37/00 384/321 |
| 2009/0127956 A1 | * | 5/2009 | Ozaki | ................... F01D 15/005 310/90.5 |

(Continued)

*Primary Examiner* — Patrick Hamo
*Assistant Examiner* — David N Brandt
(74) *Attorney, Agent, or Firm* — Tommy S F Wang; Wang IP Law Group, P.C.

(57) ABSTRACT

A centrifugal compressor assembly and method of operation provides a motor that drives a first stage compressor. The motor comprises a rotor. The motor uses radial aerostatic bearings to stabilize rotation and axial displacement of the rotor. The motor also uses a thrust aerostatic bearing to balance an axial force of the rotor. The radial aerostatic bearings and the thrust aerostatic bearing use a low-viscous vapor-liquid two-phase fluid as a lubricating medium. The radial aerostatic bearings supports the rotor. The thrust aerostatic bearing uses porous aerostatic bearings that use a low-viscous vapor-liquid two-phase fluid, so as to reduce radial and axial oscillation of the rotor. This enables clearance between a blade tip of an impeller and a volute. This causes a seal clearance to be reduced by a half; thereby increasing efficiency of the centrifugal compressor by at least 10 percent.

1 Claim, 9 Drawing Sheets (51) Int. Cl.

| | |
|---|---|
| *F04D 29/057* | (2006.01) |
| *F04D 29/051* | (2006.01) |
| *F04D 29/056* | (2006.01) |
| *F04D 29/58* | (2006.01) |
| *F04D 17/12* | (2006.01) |
| *F04D 29/063* | (2006.01) |
| *F04D 29/28* | (2006.01) |
| *F04D 29/42* | (2006.01) |

(52) U.S. Cl.
 CPC ........ *F16C 32/064* (2013.01); *F16C 32/0618* (2013.01); *F16C 32/0662* (2013.01); *F16C 32/0696* (2013.01); *F16C 2360/44* (2013.01)

(56) References Cited

U.S. PATENT DOCUMENTS

| | | | |
|---|---|---|---|
| 2009/0205360 A1* | 8/2009 | Haley | F04D 17/122 62/498 |
| 2010/0229717 A1* | 9/2010 | Schubert | F04B 35/045 92/170.1 |
| 2011/0052109 A1* | 3/2011 | Tecza | F16C 32/06 384/101 |
| 2012/0080965 A1* | 4/2012 | Bradfield | H02K 1/20 310/58 |
| 2017/0338716 A1* | 11/2017 | Gu | F16C 32/0625 |

\* cited by examiner

CENTRIFUGAL COMPRESSOR ASSEMBLY AND METHOD OF OPERATION WITH AN AIRCONDITIONER

CROSS REFERENCE OF RELATED APPLICATIONS

This application claims the benefits of Chinese application no. 201610518668.4, filed Jun. 28, 2016 and is titled the same.

FIELD OF THE INVENTION

The present invention relates generally to a centrifugal compressor assembly and method of operation with a water chiller. More so, the present invention relates to a centrifugal compressor that is operational with lower tonnage commercial air conditioning units, reduces a seal clearance by a half to increase efficiency of the centrifugal compressor by at least 10%, and stabilizes rotational and axial movement of a rotor in the motor.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, for water chillers, either water cooled or air cooled, of capacity below 200 kW, the refrigerant vapor compressing has been carried out by motor driven positive displacement machines—e.g., pistons, scrolls and screws.

Typically, centrifugal compressors are widely used in large and medium-sized commercial air-conditioning. A centrifugal compressor is formed by an impeller, a diffuser, a volute, a motor, a bearing, a base, and the like. A rotor of the motor is supported by the bearing. The motor drives the impeller. The impeller that rotates at a high speed raises energy of a refrigerant vapor. The diffuser converts kinetic energy into pressure. The volute gathers a compressed gas long a periphery of the diffuser and discharges the gas from the centrifugal compressor. The impeller of the centrifugal compressor is a component that rotates at a high speed in a central air-conditioning system, and reliability of the impeller determines reliability of air conditioning units. Moreover, reliability of the centrifugal compressor is determined by reliability of the bearing supporting the rotor of the centrifugal compressor.

Challenges that miniaturization of centrifugal compressors face are an increase in friction loss resulted from a decrease in Reynolds number, and increases in tip clearance and seal leakage loss. Due to a manufacturing factor, an impeller of a small centrifuge must be an open impeller, and increases in tip clearance and seal leakage loss remarkably exceed an increase in friction loss. Therefore, a necessary approach for improving efficiency of the small centrifuge is to reduce a leakage loss, and an approach for reducing the leakage loss relates to sizes of a tip clearance and a seal clearance, which requires reduction of oscillation of a rotor in a bearing.

The rotation speed of a centrifugal compressor is dictated by the aerodynamic design to maximize the efficiency; a lower tonnage chiller centrifugal compressor has to run at higher rotation speed. A common journal oil bearing is subjected to a sharp increase in loss with an increase in rotation speed. A ball bearing is limited by a rotation speed. Although there is no friction loss, a magnetic bearing is subjected to substantial rotor oscillation in transitional processes such as startup, shutdown and load change, and therefore can hardly be applied to small air conditioning units without sacrificing the efficiency.

Due to an increase in rotation speed and a restriction from strength of a material of a rotor of a motor, a high-speed permanent magnet motor needs to be compact. That is, power density of the motor is significantly improved, and an amount of heat generated per unit volume increases. A traditional manner of adding a water jacket outside a motor housing can hardly cool a stator of the motor effectively, and is of no use in cooling the rotor.

A static bearing is a support structure in the prior art that is of a high rotation speed as well as high axial and radial position accuracy, and has a prospect of being applied to small compressors. Static bearings are sometimes called externally-pressurized bearings, and are classified into hydrostatic bearings and aerostatic bearings; the hydrostatic use liquid and the aerostatic use gas. A static bearing fills a clearance between the bearing and a load (e.g. a rotary shaft) with a high-pressure fluid, so as to form a high-pressure oil film or gas film to support the load. An advantage of the static bearing is that, no matter the load is static or dynamic (rotating), the bearing and the load are separated by the fluid film. Therefore, a device with a static bearing operates smoothly, and involves almost no friction in start, stop, and normal operation of a machine. A disadvantage of the static bearing is that an external pressurization device is required.

The hydrostatic bearing and the aerostatic bearing have unbridgeable differences in designs and structures. If a gas is supplied to a hydrostatic bearing, or a liquid is supplied to an aerostatic bearing, the bearings do not have bearing capacities. Because a hydrostatic bearing uses liquids such as lubricating oil, whereof high density and high viscosity require a relatively larger film thickness. Meanwhile, in the bearing that rotates at a high speed, the high-viscous fluid generates a relatively large loss, causing the bearing to generate heat and to be damaged. Therefore, the hydrostatic bearing is not suitable for a small high-speed centrifugal compressor. On the contrary, a clearance of the aerostatic bearing is very small, and is usually less than $\frac{1}{10}$ of that of the hydrostatic bearing, and supplying a gas by using a low-density fluid can reduce a loss and heat generation.

Therefore, it is necessary to provide a small high-efficiency centrifugal compressor, of which a high energy density motor can be effectively cooled, and a rotor has high rotating accuracy as well as high axial position accuracy, so as to ensure safety and high-speed operation of a centrifugal impeller that has a smaller tip clearance and a smaller seal clearance than those in existing compressor technologies.

Other proposals have involved centrifugal compressors that operate with air conditioners. The problem with these systems is that they are not operational with smaller commercial air conditioning units; they can't stabilize rotational and axial movements of a rotor in the motor to reduce a tip clearance and a seal clearance for higher centrifugal compressor efficiency. Even though the above cited centrifugal compressor systems meet some of the needs of the market, a centrifugal compressor that is operational with smaller commercial air conditioning units, and stabilizes rotational and axial movement of a rotor is still desired.

SUMMARY

Illustrative embodiments of the disclosure are generally directed to a centrifugal compressor assembly and method of operation with a water chiller.

The centrifugal compressor assembly is operational with smaller commercial air conditioning units, that minimizes rotational and axial oscillation of a rotor in the motor to reduce a tip clearance and a seal clearance for higher centrifugal compressor efficiency. In some embodiments, the centrifugal compressor assembly provides a motor that drives the compressor. The motor comprises a rotor. The motor uses radial aerostatic bearings to support and stabilize the rotation of the rotor. The motor also uses a thrust aerostatic bearing to support an axial force of the rotor. The radial aerostatic bearings and the thrust aerostatic bearing use a low-viscous vapor-liquid two-phase fluid as a lubricating medium.

The confinement of the rotor with the radial aerostatic bearing and thrust aerostatic bearings enables a clearance between a blade tip of an impeller and a volute to be reduced by a half; thereby increasing efficiency of the centrifugal compressor by at least 10%.

In other embodiments, the centrifugal compressor further includes a second stage compressor, the motor is a dual-output motor, and the motor drives the second stage compressor to operate simultaneously.

In yet another embodiment, the motor includes a motor housing and a radial bearing block. The motor housing includes a housing portion and an end cover portion. The housing portion assumes a cylindrical shape. The end cover portion is disposed at a left end of the housing portion, and seals an opening at the left end of the housing portion. The radial bearing block is fastened to a right end of the housing portion, and seals an opening at the right end of the housing portion. The rotor is rotatably disposed in the motor housing;

In yet another embodiment, a right through hole is provided along a left-to-right direction in the radial bearing block. An inner wall surface of the right through hole of the radial bearing block is provided with a right vapor-liquid groove. The right through hole is provided with a right porous bushing of a right radial aerostatic bearing. A right end of the rotor is disposed in the right porous bushing.

In yet another embodiment, a left through hole is provided along a left-to-right direction in the end cover portion. An inner wall surface of the left through hole of the end cover portion is provided with a left vapor-liquid groove. The left through hole is provided with a left porous bushing of a left radial aerostatic bearing. A left end of the rotor is disposed in the left porous bushing. The left end of the rotor is supported on the end cover portion by using the thrust aerostatic bearing;

In yet another embodiment, the left radial aerostatic bearing, the right radial aerostatic bearing, and the thrust aerostatic bearing are all porous aerostatic bearings that use a low-viscous vapor-liquid two-phase fluid as a lubricating medium.

In yet another embodiment, the first stage compressor comprises a first volute and a first impeller. The second stage compressor comprises a second volute and a second impeller. The first volute is fastened to the end cover portion and is located at a left side of the end cover portion. The first impeller is fastened to the left end of the rotor of the motor and is located in the first volute. The second volute is fastened to the radial bearing block and is located at a right side of the radial bearing block. The second impeller is fastened to the right end of the rotor of the motor and is located in the second volute. Both the first impeller and the second impeller are open impellers.

In yet another embodiment, the motor further includes a stator disposed between the rotor and the housing portion. The stator is formed by a lamination and a coil. The coil is wound on the lamination. An annular groove is formed on an inner wall surface of the housing portion. An axis of the annular groove coincides with an axis of the housing portion. A width of a left-to-right direction of the lamination is greater than a width of a left-to-right direction of the annular groove. The lamination is installed on an inner wall of the housing portion, and covers the annular groove, so as to form a cavity between the lamination and the inner wall surface of the motor housing.

In yet another embodiment, the housing portion comprises an inlet channel for a low-viscous two-phase fluid to enter and an outlet channel for a low-viscous two-phase fluid to be discharged. The inlet channel is in communication with the annular groove. The housing portion is further provided with a left cooling channel and a right cooling channel. One end of the left cooling channel is in communication with the inlet channel, and the other end is in communication with accommodation space at a left side of the stator. Furthermore, one end of the right cooling channel is in communication with the inlet channel, and the other end is in communication with accommodation space at a right side of the stator.

In yet another embodiment, the radial bearing block is provided with a right vapor channel. The right vapor channel is in communication with the right vapor-liquid groove. The end cover portion is provided with a left vapor channel, and the left vapor channel is in communication with the left vapor-liquid groove.

In yet another embodiment, the thrust aerostatic bearing includes two thrust bearings, an adjustment ring, and a thrust disc. Each of the thrust bearings includes a disc seat and a porous ring. Each of the disc seats is provided with an accommodation groove, and the corresponding porous ring is disposed in the accommodation groove. Each of the porous rings is provided with a fluid channel. Each of the disc seats is provided with a vapor channel. The vapor channel is in communication with the corresponding fluid channel. The porous rings of the two thrust bearings are oppositely disposed. The adjustment ring is located between the disc seats of the two thrust bearings. And the thrust disc is fastened to the rotor and is located between the porous rings of the two thrust bearings.

In yet another embodiment, the assembly further includes a vapor supply system, where the vapor supply system includes a condenser and a heating tank. An inlet of the condenser is in communication with an outlet of a second stage compressor. An inlet of the heating tank is in communication with an outlet of the condenser. And an outlet of the heating tank is in communication with the vapor-liquid grooves of the radial aerostatic bearings and the vapor channels of the thrust aerostatic bearing.

In yet another embodiment, the vapor supply system further includes a storage tank. The outlet of the heating tank is in communication with an inlet of the storage tank through a first check valve. An outlet of the storage tank is in communication with the vapor-liquid grooves of the radial aerostatic bearings and the vapor channels of the thrust aerostatic bearing. The outlet of the second stage compressor is also in communication with the inlet of the storage tank through a second check valve. The first check valve only allows a vapor to flow from the heating tank to the storage tank. The second check valve only allows a vapor to flow from the second stage compressor to the storage tank.

The present invention has multiple advantages. The centrifugal compressor of the assembly includes a motor. In the motor, a radial aerostatic bearing and a thrust aerostatic bearing, supporting a rotor of the motor, utilize porous aerostatic bearings using a low-viscous vapor-liquid two-phase refrigerant, so as to reduce radial and axial oscillation of the rotor. This enables a clearance between a blade tip of an impeller and a volute and a seal clearance to be reduced by a half (reduced to be less than 100 μm).

Consequently, the efficiency of the centrifugal compressor increases by at least 10%. Moreover, a liquid entering the radial aerostatic bearings and the thrust aerostatic bearing further functions to increase bearing capacities of the radial aerostatic bearings and the thrust aerostatic bearing and to cool the radial aerostatic bearings, the thrust aerostatic bearing, and the rotor of the motor.

One objective of the present invention is to provide a centrifugal compressor, so as to resolve a problem of a decrease in efficiency caused by miniaturization of centrifugal compressors.

Another objective is to reduce radial and axial oscillation of the rotor of the motor.

Yet another objective is to miniaturize a centrifugal compressor opt operate in smaller air conditioning units.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A centrifugal compressor assembly 100 and method 200 of operation with a water chiller is referenced in FIGS. 1-7. The centrifugal compressor assembly 100, hereafter "assembly 100" provides a pressure rise by adding kinetic energy/velocity to a continuous flow of fluid through the rotor or impeller. This kinetic energy is then converted to an increase in potential energy and static pressure by slowing the flow through a diffuser.

In some embodiments, the assembly 100 comprises a motor 196 that drives a first stage compressor 198. The motor 196 comprises a rotor 122. The motor 196 uses a left portion and a right portion of the radial aerostatic bearings 192, 194 to stabilize both rotation and axial displacement of the rotor 122. The motor 196 also uses a thrust aerostatic bearing 130 to balance an axial force the rotor 122. The radial aerostatic bearings 192, 194 and the thrust aerostatic bearing 130 use a low-viscous vapor-liquid two-phase fluid as a lubricating medium. The radial aerostatic bearings 192, 194 supports the rotor 122. The thrust aerostatic bearing 130 uses porous aerostatic bearings that use a low-viscous vapor-liquid two-phase fluid, so as to reduce radial and axial oscillation of the rotor 122. This enables a reduced clearance between a blade tip of an impeller 144 and a volute 146. This causes a seal clearance to be reduced by a half; thereby increasing efficiency of the centrifugal compressor by at least 10%.

Figure 1:
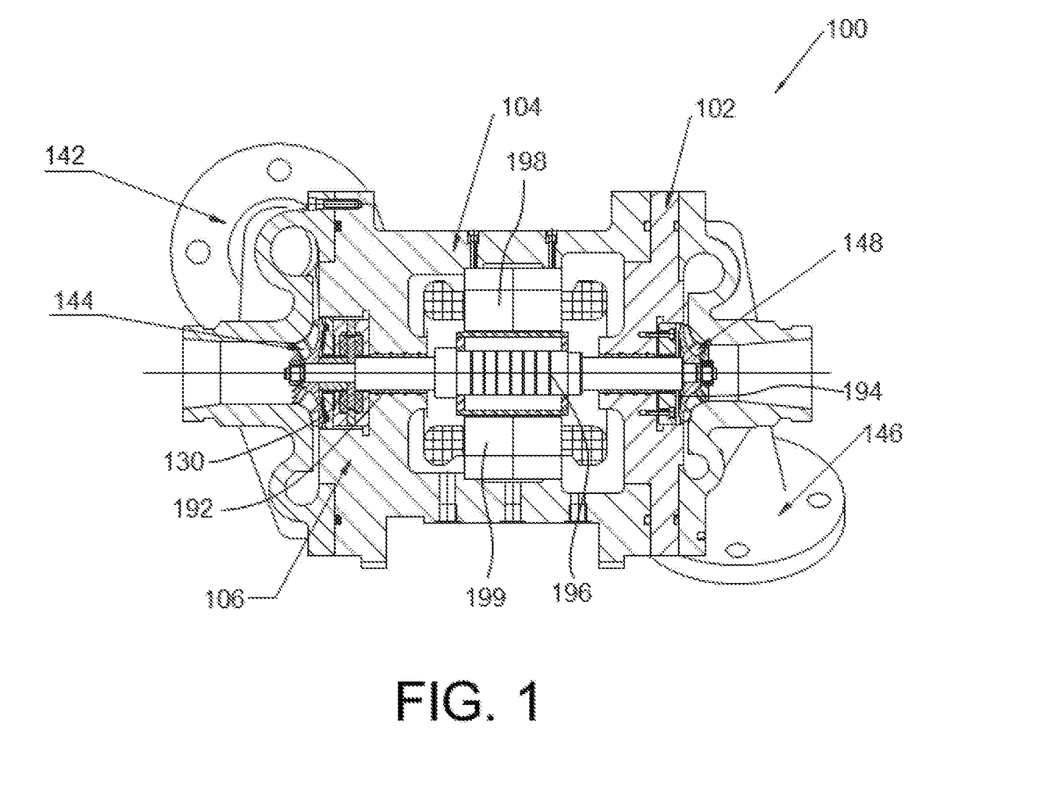
FIG. 1 is a schematic structural diagram of a centrifugal compressor, in accordance with an embodiment of the present invention.

As referenced in FIG. 1, a small centrifugal compressor assembly 100, including: a motor 196, a first stage compressor 198, and a second stage compressor 199. The motor 196 drives the first stage compressor 198 and the second stage compressor 199 to operate. In some embodiments, the motor 196 may include a high-speed permanent magnet motor, and the high-speed permanent magnet motor uses radial aerostatic bearings to support rotation of a rotor of the motor, and uses a thrust aerostatic bearing to balance an axial force of the rotor of the motor; and the radial aerostatic bearings and the thrust aerostatic bearing use a low-viscous vapor-liquid two-phase fluid as a lubricating medium.

In this embodiment, when the centrifugal compressor assembly 100 only includes the first stage compressor, the centrifugal compressor assembly 100 is a single-stage compressor. When the centrifugal compressor assembly 100 includes the first stage compressor and the second stage compressor, the centrifugal compressor is a two-stage compressor, and at this time, the motor is a dual-output motor, the first stage compressor is disposed at a left end of the motor, and the second stage compressor is disposed at a right end of the motor.

Figure 3:
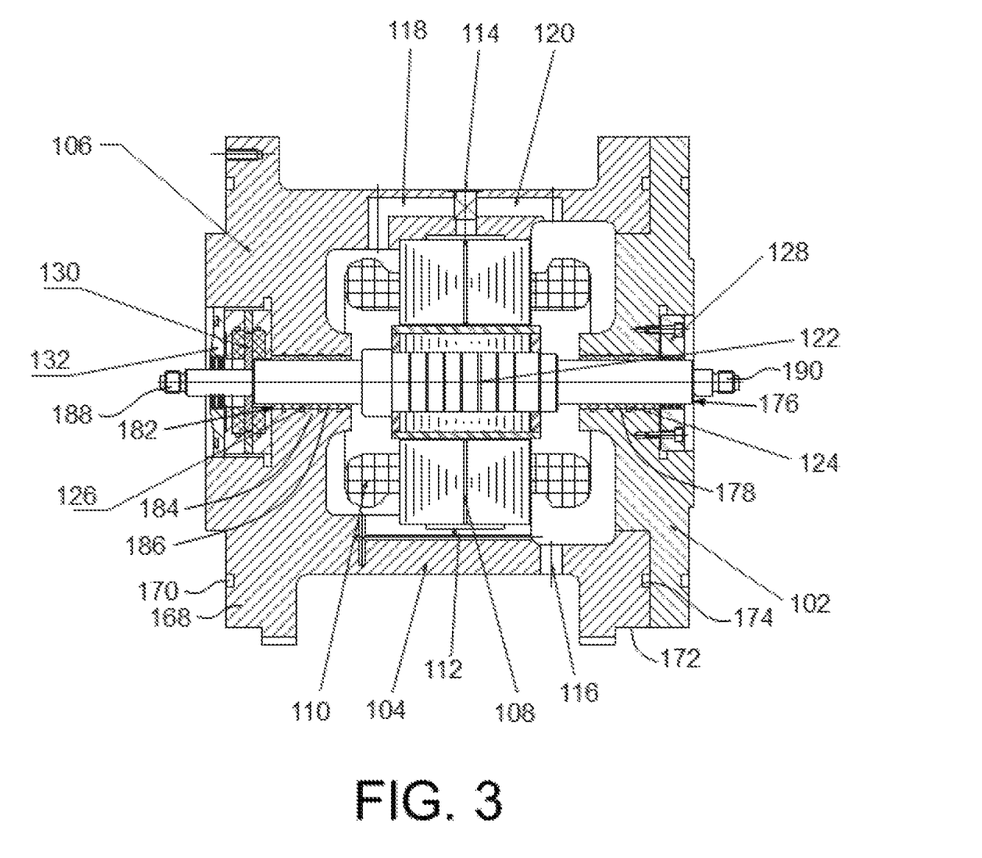
FIG. 3 is a schematic structural diagram of a motor, in accordance with an embodiment of the present invention.

FIG. 3 is a schematic structural diagram of a motor 196. Preferably, the motor 196 includes a motor housing and a radial bearing block 102. The motor housing includes a housing portion 104 and an end cover portion 106. The housing portion assumes a cylindrical shape. In the housing portion, accommodation space penetrating through the housing portion is formed along an axial direction of the housing portion. The end cover portion 106 is disposed at a left end 168 of the housing portion 104, and seals an opening 170 at the left end 168 of the housing portion 104. In this embodiment, the housing portion 104 and the end cover portion 106 may be integrally formed, by using a die casting method, for example, to form the motor housing.

Figure 4A:
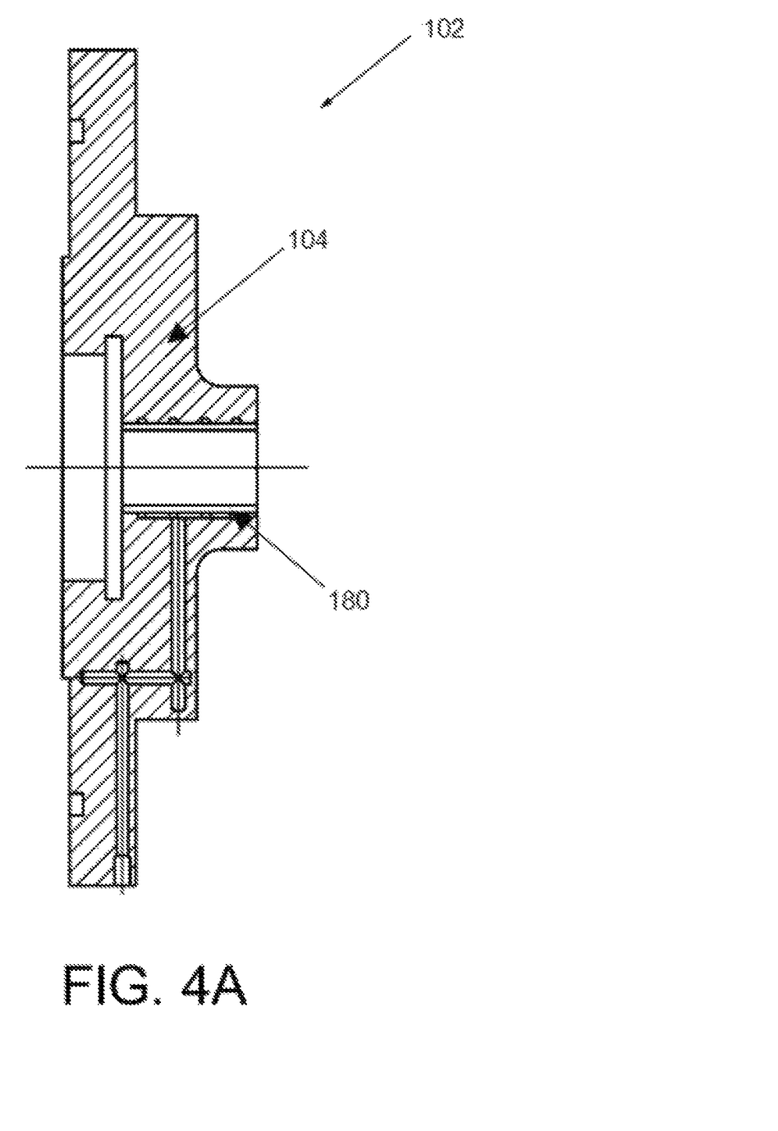
FIG. 4A is a schematic structural diagram of a radial bearing before installing a porous bushing.
Figure 4B:
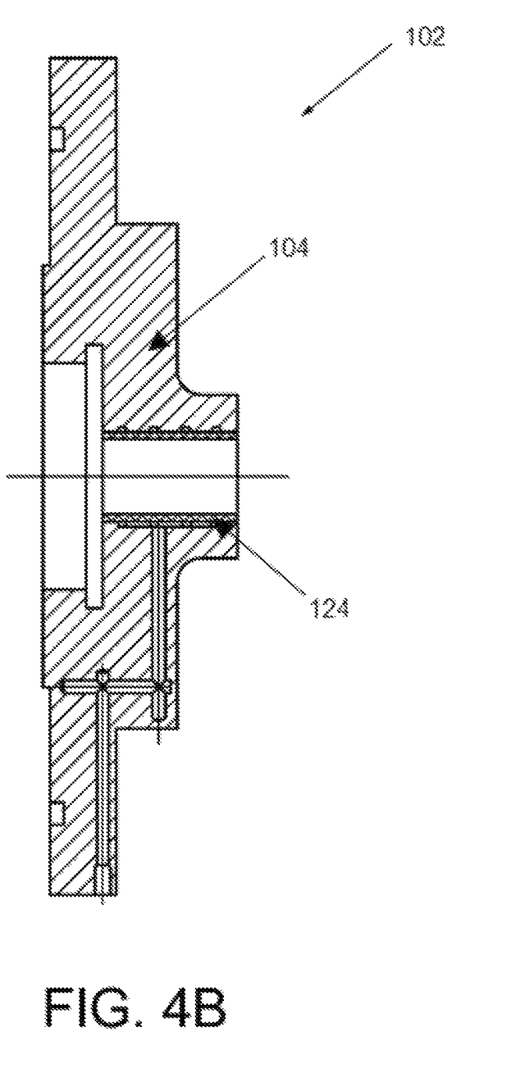
FIG. 4B is a schematic structural diagram of a radial bearing block, in accordance with an embodiment of the present invention.

As FIG. 4 references, the radial bearing block 102 fastens to a right end 172 of the motor housing (the housing portion), and seals an opening 174 at the right end 172 of the housing portion 104. In this embodiment, the motor housing and the radial bearing block seal the accommodation space, so as to prevent a vapor in a low-viscous two-phase fluid entering the accommodation space from being leaked to the outside of the accommodation space.

A stator is installed on an inner wall of the motor housing. In this embodiment, the stator is formed by a lamination 108 and a coil 110, and the coil is wound on the lamination. The coil at an outer side of the lamination forms end portions of the stator. A part of the lamination and the motor housing are in a hot pressing fit, that is, the lamination can transfer heat generated by the lamination to the motor housing. In this embodiment, an annular groove 112 is formed on an inner wall surface of the housing portion. An axis of the annular groove coincides with an axis of the housing portion. A width of a left-to-right direction of the lamination is greater than a width of a left-to-right direction of the annular groove. When the lamination is installed on an inner wall of the housing portion, the lamination covers the annular groove, so as to form a cavity between the lamination and the inner wall surface of the motor housing. The cavity is the annular groove. At this time, the cavity can be used to store a low-viscous two-phase fluid.

In this embodiment, in order to supply the low-viscous two-phase fluid to the annular groove, the motor housing is further provided with an inlet channel 114 for a low-viscous two-phase fluid to enter and an outlet channel 116 for a low-viscous two-phase fluid to be discharged. The inlet channel is in communication with the annular groove. The outlet channel is connected to an evaporator, so as to enable a pressure in the motor housing to be equal to a saturation pressure of the evaporator.

In this embodiment, in order to cool the end portions of the stator, the housing portion is further provided with a left cooling channel 118 and a right cooling channel 120. One end of the left cooling channel is in communication with the inlet channel, and the other end is in communication with accommodation space at a left side of the stator. One end of the right cooling channel is in communication with the inlet channel, and the other end is in communication with accommodation space at a right side of the stator. When the low-viscous two-phase fluid is supplied through the inlet channel, the low-viscous two-phase fluid can enter the left side and the right side of the stator, so as to effectively cool the end portions at the left side and the right side of the stator.

In this embodiment, a rotor 122 is further disposed in the motor housing, and the rotor is disposed in the stator. In this embodiment, two ends 188, 190 of the rotor 122 are supported on the motor housing separately by using a left radial aerostatic bearing 192 and a right radial aerostatic bearing 194. A left end 188 of the rotor 122 is supported on the motor housing by using a thrust aerostatic bearing, so that the rotor 122 can rotate at a high speed in the stator of the motor with the support of the radial aerostatic bearings and can bear axial thrust of a left direction and a right direction with the support of the thrust aerostatic bearing, thereby enabling the rotor to have relatively high axial position accuracy.

The right radial aerostatic bearing 194 includes a right porous bushing 124. In this embodiment, a right through hole 176 is provided along a left-to-right direction in the radial bearing block 102. An inner wall surface 178 of the right through hole 176 of the radial bearing block 102 is provided with a right vapor-liquid groove 180. The right porous bushing is disposed in the right through hole. The right end of the rotor is disposed in the right porous bushing, so as to enable a high-temperature high-pressure vapor-liquid two-phase refrigerant to enter, by permeating the porous material from the right vapor-liquid groove, a small clearance between the right radial aerostatic bearing and the rotor. In the clearance, vapor and liquid refrigerants support the rotor together.

Because the liquid is incompressible, the right radial aerostatic bearing, as compared with an air bearing, has a higher bearing capacity and higher stiffness. An amount of refrigerant entering the clearance depends on a pressure difference of two sides of the porous material. A pressure reduction process is also a cooling process. A part of the liquid refrigerant is vaporized, due to the pressure reduction, to generate a low-temperature vapor refrigerant and liquid refrigerant, so as to cool the right radial aerostatic bearing and the rotor.

The left radial aerostatic bearing 192 includes a left porous bushing 126. In this embodiment, a left through hole 182 is provided along a left-to-right direction in the end cover portion 106. An inner wall surface 184 of the left through hole 182 of the end cover portion 106 is provided with a left vapor-liquid groove 186. The left porous bushing 126 is disposed in the left through hole 182. The left end of the rotor is disposed in the left porous bushing, so as to enable a high-temperature high-pressure vapor-liquid two-phase refrigerant to enter, by permeating the porous material from the left vapor-liquid groove, a small clearance between the left radial aerostatic bearing 192 and the rotor. In the clearance, vapor and liquid refrigerants support the rotor together.

Because the liquid is incompressible, the left radial aerostatic bearing 192, as compared with an air bearing, has a higher bearing capacity and higher stiffness. An amount of refrigerant entering the clearance depends on a pressure difference of two sides of the porous material. A pressure reduction process is also a cooling process. A part of the liquid refrigerant is vaporized, due to the pressure reduction, to generate a low-temperature vapor refrigerant and liquid refrigerant, so as to cool the left radial aerostatic bearing and the rotor.

In this embodiment, the radial bearing block 102 is provided with a right vapor channel, and the right vapor channel is in communication with the right vapor-liquid groove. Meanwhile, the end cover portion is provided with a left vapor channel, and the left vapor channel is in communication with the left vapor-liquid groove.

In this embodiment, in order to seal the right radial aerostatic bearing 194, the high-speed permanent magnet motor further includes a right seal 128, and the right seal 128 is fastened to the radial bearing block 102. In this embodiment, the right seal may be a seal member or a seal ring. When the right seal 128 is a seal cover, the right seal 128 covers the right end of the rotor and the right radial aerostatic bearing 194, and at this time, the motor is a single-output motor, that is, the left end 188 of the rotor 122 of the motor can output power. When the right seal is a seal ring, the right end 190 of the rotor 122 penetrates through the seal ring, and at this time, the right end 190 of the rotor 122 of the motor can also output power, and the seal ring is in sealing contact with the rotor 122 of the motor.

DETAILED DESCRIPTION OF THE INVENTION

Figure 5A:
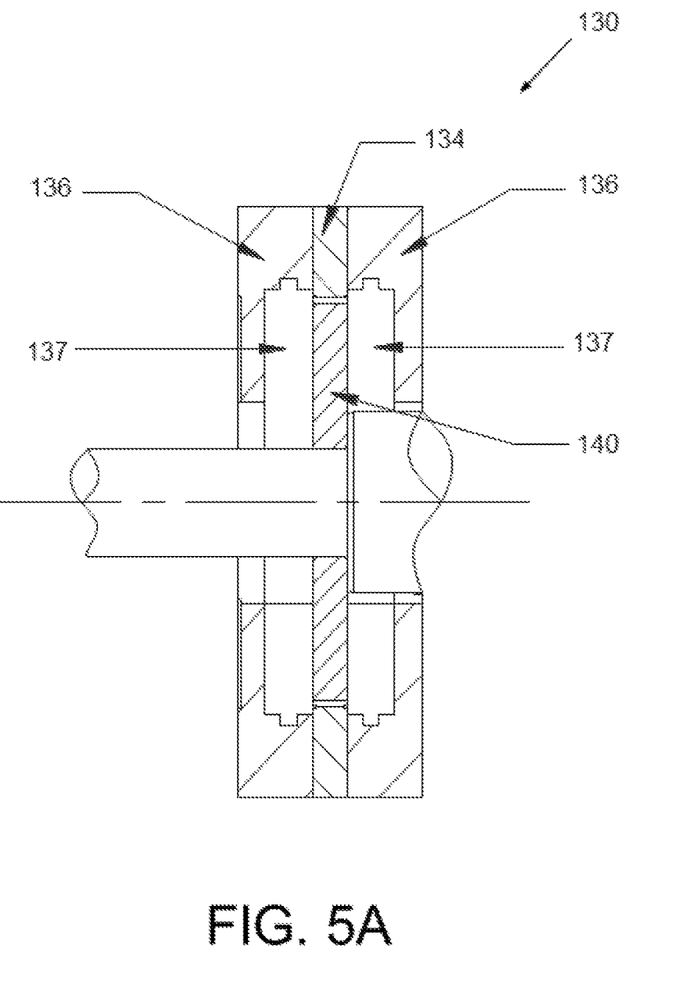
FIG. 5A is a schematic structural diagram of a thrust aerostatic bearing before installing porous rings.
Figure 5B:
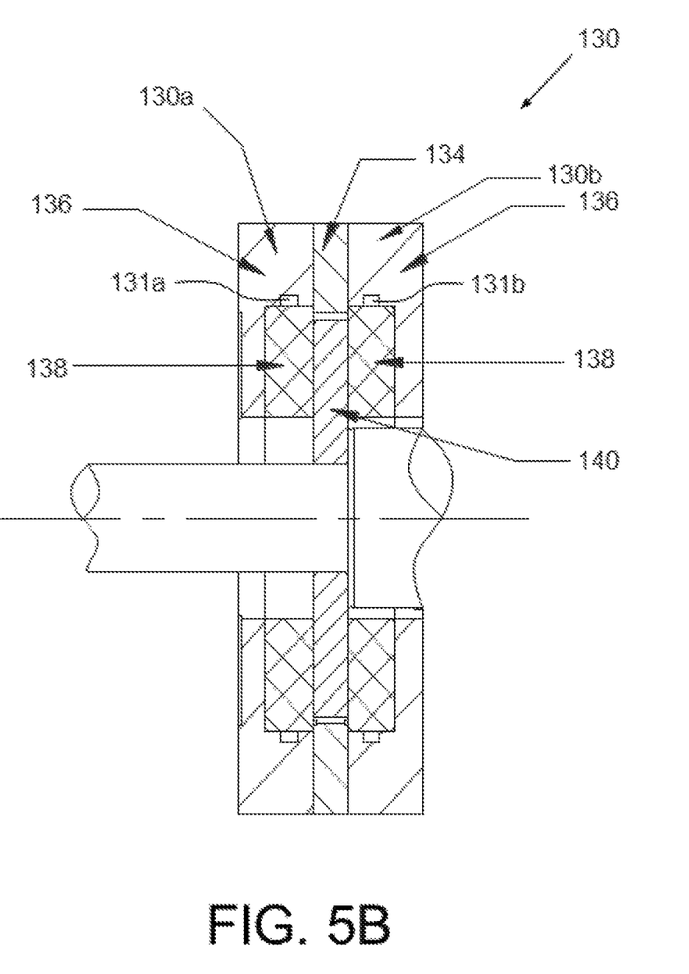
FIG. 5B is a schematic structural diagram of a thrust aerostatic bearing, in accordance with an embodiment of the present invention.
Figure 5C:
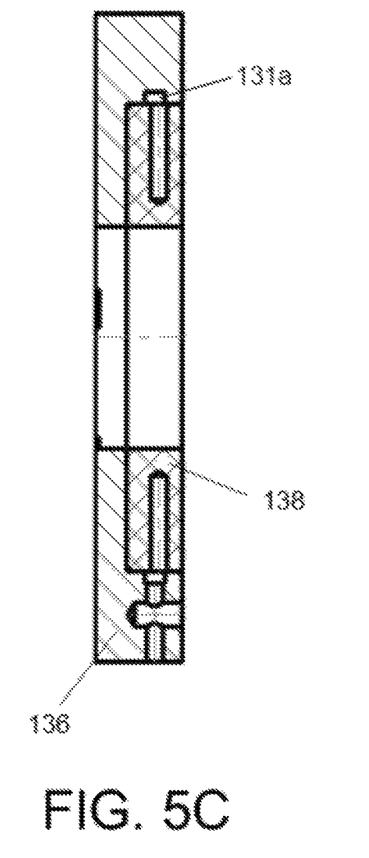
FIG. 5C is a schematic structural diagram of a thrust bearing, in accordance with an embodiment of the present invention.

Turning now to the diagram in FIGS. 5A-5C, the thrust aerostatic bearing 130 includes two face-to-face disposed thrust bearings 130a/130b. An adjustment ring 134 is disposed between the two thrust bearings 130a/130b. Each of the thrust bearings 130a/130b includes a disc seat 136 and a porous ring. The adjustment ring is disposed between the two disc seats 136, so as to adjust a distance between the two thrust bearing 130a/130b by adjusting a thickness of the adjustment ring 134 (FIG. 5A).

Each of the disc seats is provided with an accommodation groove 137, and the corresponding porous ring 138 is disposed in the accommodation groove 137. Each of the porous rings 138 is provided with a fluid channel. Each of the disc seats is provided with a disc seat vapor channel 131a/131b, and the disc seat vapor channel 131a/131b is in communication with the corresponding fluid channel, so as to enable a low-viscous two-phase fluid, formed after cooling a high-temperature high-pressure saturated vapor entering the disc seat vapor channel 131a/131b, to enter the disc seat vapor channel 131a/13b, and further to penetrate through the porous ring.

In this embodiment, the porous rings of the two thrust bearings are face-to-face disposed. A thrust disc 140 is disposed between the porous rings of the two thrust bearings, that is, the thrust disc is located at a cavity between two oppositely disposed thrust bearings. The rotor includes a shaft shoulder, and the rotor penetrates through the thrust disc. The thrust disc is fitted with the axial direction and is fastened to the rotor, so as to limit an axial position of the rotor by controlling a position of the thrust disc.

After penetrating through each of the porous rings, the low-viscous two-phase fluid enters the clearance between the porous ring and the thrust disc, so as to retain the thrust disc at a position that is not in contact with the porous ring of the thrust bearing, thereby limiting the axial position of the rotor. In this embodiment, the fluid channel extends inwardly from a circumferential surface of each of the porous rings along a radial direction of the porous ring.

The thrust aerostatic bearing is located at a left side of the left radial aerostatic bearing. In this embodiment, in order to seal the left radial aerostatic bearing, the high-speed permanent magnet motor further includes a left seal, and the left seal is fastened to the end cover portion. The left seal 132 is a seal ring. The left end of the rotor penetrates through the seal ring, and at this time, the left end of the rotor of the motor can output power. The sear ring is in sealing contact with the rotor of the motor.

The first stage compressor includes a first volute 142 and a first impeller 144. The second stage compressor includes a second volute 146 and a second impeller 148. The first volute 142 is fastened to the end cover portion and is located at a left side of the end cover portion. The first impeller 144 is fastened to the left end of the rotor of the motor and is located in the first volute 142. When the motor drives the first impeller 144 to rotate, the first impeller 144 can enable a refrigerant entering the first volute 142 to be compressed.

In this embodiment, the second volute 146 is fastened to the radial bearing block and is located at a right side of the radial bearing block. The second impeller 148 is fastened to the right end of the rotor of the motor and is located in the second volute 146. When the motor drives the second impeller 148 to rotate, the second impeller 148 can enable a refrigerant entering the second volute 146 to be compressed. Moreover, more preferably, both of the first impeller 144 and the second impeller 148 are open impellers, and a clearance between a blade tip of each of the impellers and the volute is less than 100 μm, thereby enabling the efficiency of the centrifugal compressor of the present invention, as compared with the prior art, to be improved by at least 10%.

Figure 2:
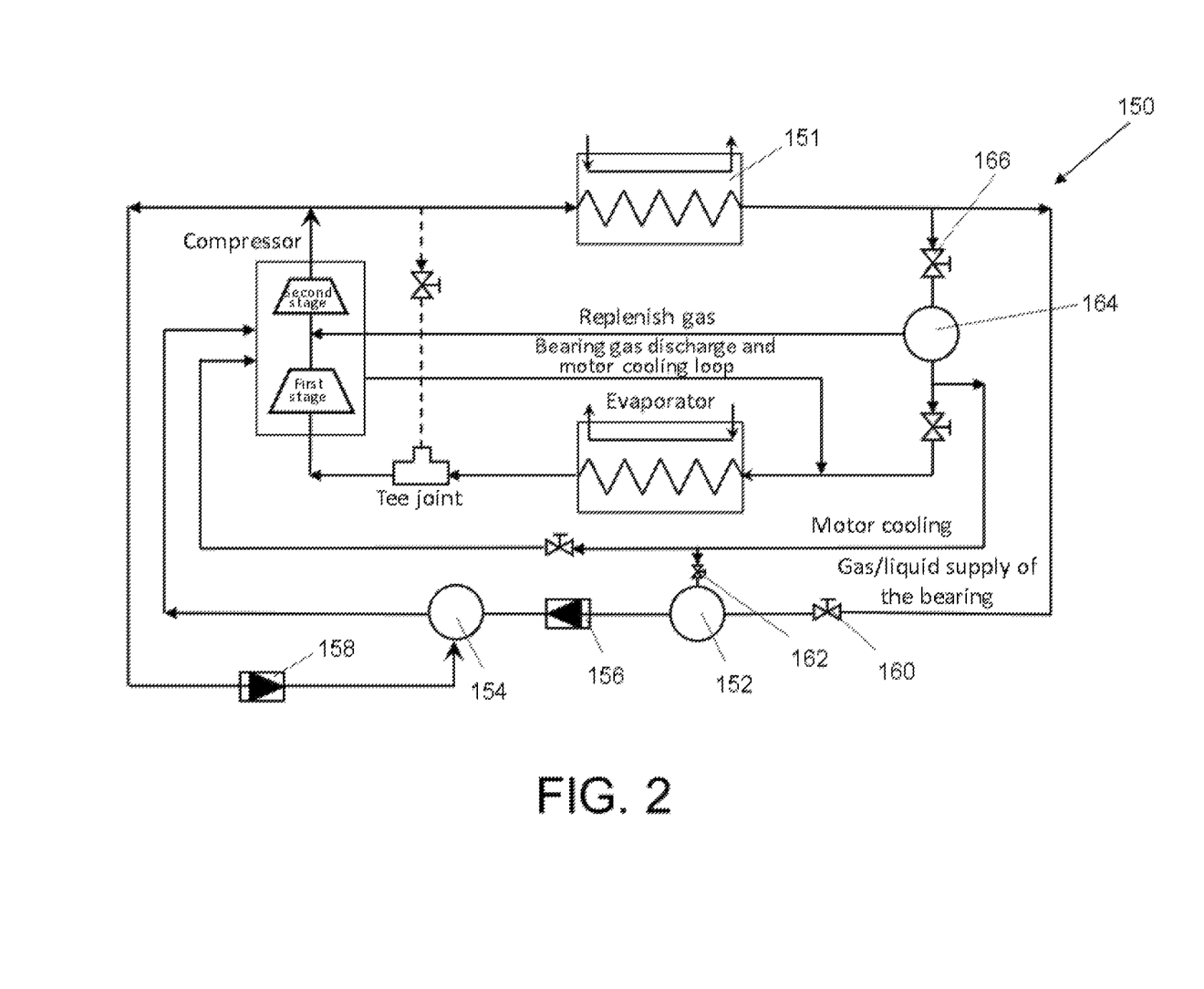
FIG. 2 is a schematic structural diagram of a vapor supply system, in accordance with an embodiment of the present invention.

FIG. 2 is a schematic structural diagram of a vapor supply system 150. In order to supply a vapor to the radial aerostatic bearings and the thrust aerostatic bearing, the centrifugal compressor further includes a vapor supply system 150, where the vapor supply system 150 includes a condenser 151 and a heating tank 152. An inlet of the condenser is in communication with an outlet of the second stage compressor; an inlet of the heating tank is in communication with an outlet of the condenser. An outlet of the heating tank 152 is in communication with the vapor-liquid grooves of the radial aerostatic bearings and the vapor channels of the thrust aerostatic bearing.

The heating tank 152 is used to heat the low-viscous two-phase fluid therein, so as to raise a saturation temperature of the fluid. Features of a two-phase fluid show that a high saturation temperature corresponds to a high saturation pressure. The outlet port of the heating tank can be at the bottom to supply liquid, or at the top to provide vapor, or at the liquid level inside the tank to provide vapor-liquid two phase fluid to the bearings (including the left radial aerostatic bearing, the right radial aerostatic bearing, and the thrust aerostatic bearing).

For the radial aerostatic bearings, the saturated vapor from the heating tank enters the vapor-liquid grooves of the radial aerostatic bearings, that is, a vapor outlet of the heating tank is in communication with the vapor-liquid grooves (or vapor channel) of the radial aerostatic bearings. Temperatures of the radial aerostatic bearings are less than a temperature of the heating tank, and therefore, a vapor refrigerant (an example of a low-viscous two-phase fluid) is cooled to form a vapor-liquid two-phase fluid in the radial aerostatic bearings. After passing through the porous bushing of each of the radial aerostatic bearings, the vapor-liquid two-phase fluid enters a small clearance between the radial aerostatic bearing and the rotor. At two ends of each of the radial aerostatic bearings, the pressure of the vapor in the clearance is decreased to a saturation pressure in the evaporator. A pressure of an axial central position of the clearance is relatively high. The pressure is gradually decreased with the vapor-liquid two-phase fluid flowing to two ends of the clearance. The liquid is vaporized, so as to cool the radial aerostatic bearing and the rotor.

For the thrust aerostatic bearing, the saturated vapor from the heating tank enters the vapor channels of the thrust aerostatic bearing, that is, the vapor outlet of the heating tank is in communication with the vapor channels of the thrust aerostatic bearing. A temperature of the thrust aerostatic bearing is less than a temperature of the heating tank, and therefore, a vapor refrigerant is cooled to form a vapor-liquid two-phase fluid in the thrust aerostatic bearing. After passing through each of the porous rings of the thrust aerostatic bearing, the vapor-liquid two-phase fluid enters a small clearance between the aerostatic bearing and the thrush disc. At an edge of the thrust aerostatic bearing, the pressure of the vapor in the clearance is decreased to a saturation pressure in the evaporator. A pressure of a radial central position of the clearance is relatively high. The pressure is gradually decreased with the vapor-liquid two-phase fluid flowing to inner end and the outer end of the clearance. The liquid is vaporized, so as to cool the aerostatic bearing and the thrust disc.

Certainly, in this embodiment, a storage tank 154 may be used to buffer a high-temperature vapor refrigerant discharged from the outlet of the heating tank, and a first check valve 156 is disposed between the heating tank and the storage tank. The first check valve only allows a vapor to flow from the heating tank to the storage tank. At this time, the outlet of the heating tank is in communication with an inlet of the storage tank by using the first check valve, and an outlet of the storage tank is in communication with the vapor-liquid grooves of the radial aerostatic bearings and the vapor channels of the thrust aerostatic bearing.

In this embodiment, when a pressure of a vapor refrigerant discharged from the second stage compressor is relatively high, a vapor may be directly supplied to the radial aerostatic bearings and the thrust aerostatic bearing. In this embodiment, the outlet of the second compressor is connected to the inlet of the storage tank by using a second check valve 158, and the second check valve only allows a fluid to flow from the second stage compressor to the storage tank.

Figure 6:
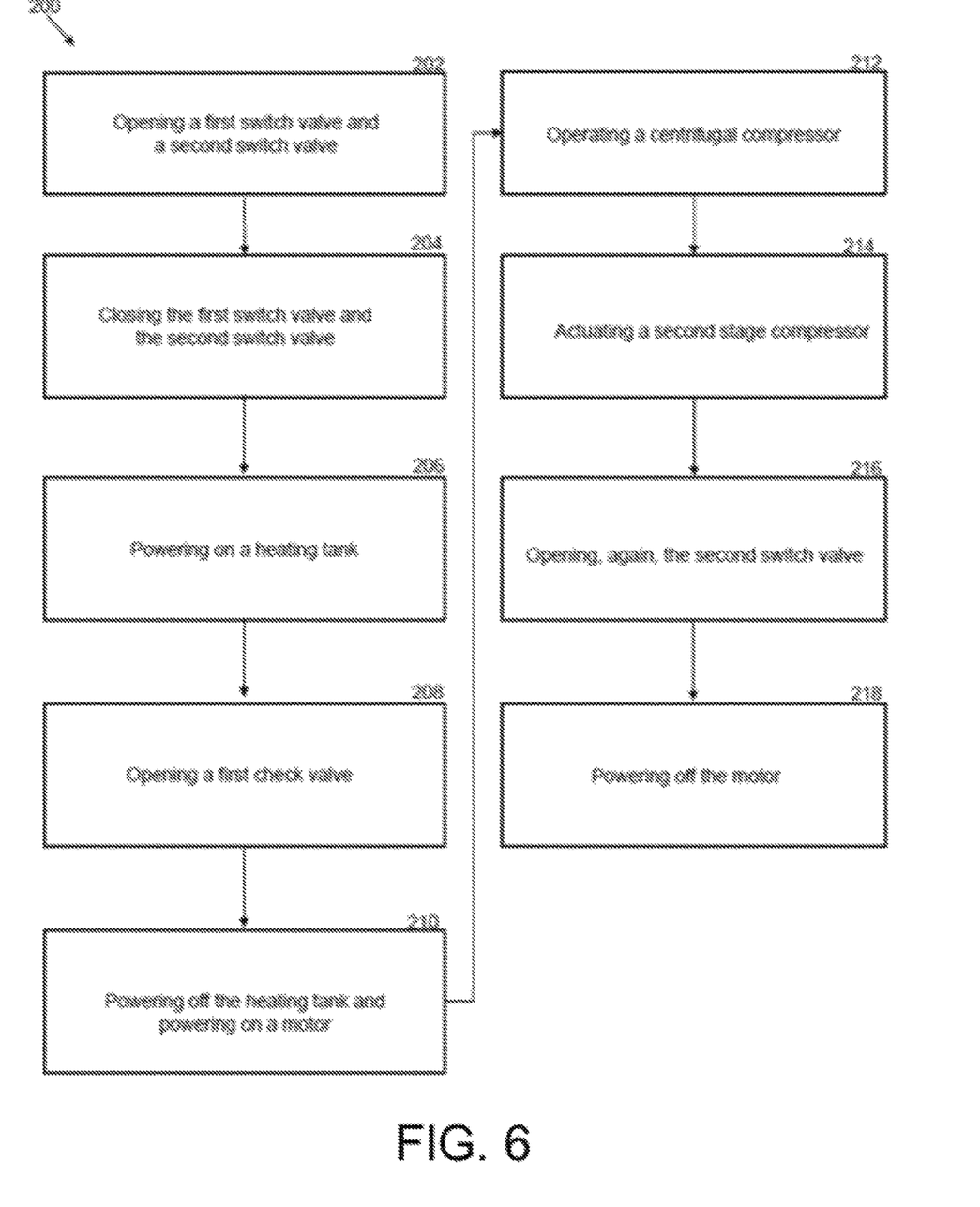
FIG. 6 is a flowchart diagram of an exemplary method for operation of a centrifugal compressor assembly with a water chiller, in accordance with an embodiment of the present invention.

In order to force the fluid to flow only from the condenser to the heating tank, in this embodiment, the outlet of the condenser is in communication with the inlet of the heating tank by using a first switch valve 160, and an outlet of an economizer is in communication with the inlet of the heating tank by using a second switch valve 162. At this time, a working principle of the vapor supply system of this embodiment is as follows:

FIG. 7 is a flowchart diagram of an exemplary method 200 for operation of a water chiller with a centrifugal compressor. The method comprises an initial Step 202 of opening a first switch valve and a second switch valve. Before the centrifugal compressor operates, the vapor supply system is of a same pressure. However, because a position of the economizer 164 is relatively low and a position of the heating tank is lower than the position of the economizer, a liquid refrigerant is stored in the economizer due to the gravity. Then the first switch valve and the second switch valve are opened, so as to replenish the heating tank with the liquid. A Step 204 may include closing the first switch valve and the second switch valve. After the liquid replenishing, the first switch valve and the second switch valve are closed.

A Step 206 may include an electrical heater on a heating tank. The heating tank is powered on to heat the refrigerant; and the temperature of the refrigerant is increased, and the pressure is also increased.

A Step 208 may include opening a first check valve. With the increase in the pressure in the heating tank, the first check valve is opened. This enables a vapor-liquid two-phase refrigerant in the heating tank enters the storage tank; and the storage tank immediately supplies the vapor-liquid two-phase refrigerant to the radial aerostatic bearings and the thrust aerostatic bearing. An amount of vapor consumed by the radial aerostatic bearings and the thrust aerostatic bearing is far less than an amount of high-pressure fluid generated in the heating tank, and therefore, the excessive vapor-liquid two-phase refrigerant remains in the storage tank. Meanwhile, a liquid level in the heating tank drops. However, the volume of unit mass of a refrigerant vapor is about one hundred times of that of a refrigerant liquid, and therefore, the liquid level in the heating tank drops slowly. The heating tank continues heating, and pressures in the heating tank and the storage tank continue being increased to achieve a normal working pressure of a bearing.

A Step 210 includes powering off a heating tank and powering on a motor. The heating tank is powered off, the first check valve is automatically closed, and the motor is powered on and is started.

A Step 212 may include operating the centrifugal compressor. With the start of the motor, the centrifugal compressor is in a working state. A loop of the condenser-evaporator works; a temperature and a pressure in the evaporator are simultaneously decreased. A pressure of a vapor discharge loop of the radial aerostatic bearings and the thrust aerostatic bearing is simultaneously decreased, so that a difference between a supplied vapor and a discharged vapor of each of the radial aerostatic bearings and the thrust aerostatic bearing is increased.

However, with the reduction of the vapor in the storage tank, the pressure in the storage tank is decreased; and a difference between an inlet and an outlet of each of the radial aerostatic bearings and the thrust aerostatic bearing is also decreased. The first check valve is automatically opened, so as to replenish the storage tank with liquid. And vaporization of the liquid causes decreases in the pressure and temperature in the heating tank and the storage tank.

The method 200 may also include a Step 214 of actuating a second stage compressor. After the centrifugal compressor works normally, if a discharge pressure of the second stage compressor is greater than the pressure in the storage tank, the second stage compressor fills the storage tank with the vapor by using the second check valve; and the storage tank continues supplying the vapor to the bearings.

A Step 216 may include opening, again, the second switch valve. When the liquid level in the heating tank is lower than a particular value, the second switch valve is slowly opened for a short time, so as to decrease the pressure in the heating tank. Then the second switch valve is closed, and the first switch valve is opened to replenish the heating tank with the liquid until the liquid level achieves a specified height. A heater in the heating tank is started to achieve a specified temperature/pressure. The design of the heating tank and the liquid replenishing process ensures that the storage tank keeps supplying the vapor to the bearings during the liquid replenishing process. A Step 218 comprises powering off the motor. After the motor is powered off, the centrifugal compressor stops rotating, and the first switch valve and the second switch valve are closed.

In one embodiment, the low-viscous two-phase fluid may be the refrigerant. The refrigerant has a feature of a low viscosity coefficient; and when the refrigerant is vaporized, a low-temperature vapor refrigerant can be obtained, which is used to cool the stator and rotor of the motor. The vapor refrigerant and the liquid refrigerant discharged from the radial aerostatic bearings and the thrust aerostatic bearing, and the refrigerant for cooling the stator of the motor enter the evaporator by using the discharge channel, and enter the first stage compressor by using the evaporator.

In order to cool the stator of the motor, the vapor supply system further includes an economizer. An inlet of the economizer is in communication with the outlet of the condenser. Preferably, the outlet of the condenser is in communication with the inlet of the economizer by using an electronic expansion valve 166. An outlet of the economizer is in communication with the inlet channel of the motor by using the electronic expansion valve, so as to supply the vapor-liquid two-phase refrigerant to the motor, thereby cooling the stator of the motor.

In this embodiment, the outlet of the economizer is further in communication with the inlet of the second stage compressor; the outlet of the economizer is further in communication with the inlet of the evaporator by using the electronic expansion valve; and the outlet of the evaporator is in communication with the inlet of the first stage compressor, so as to circulate the vapor-liquid two-phase refrigerant of the centrifugal compressor.

The small centrifugal compressor of the present invention has features of a high rotation speed and open impellers. A blade tip clearance of an open impeller is determined by a bearing clearance, and a same bearing technology requires a blade tip clearance of a same size regardless of a size of an impeller, causing that a ratio of a leaked vapor of the tip of a small open impeller to impeller flow is significantly increased, and the efficiency of a small centrifuge is reduced. With the present invention, leaked vapor of a tip of an open impeller can be reduced by a half, so as to increase the efficiency of a small centrifugal compressor by at least 10%.

With the centrifugal compressor assembly 100 of the present invention, a rotor of a motor is supported by aerostatic bearings that use a vapor-liquid two-phase fluid, and a permanent magnet rotor is used to reduce an energy loss and heat generation of the rotor; a refrigerant lubricates aerostatic bearings and cools the motor; and due to high rotating accuracy of radial aerostatic bearings and high axial position accuracy of an thrust aerostatic bearing, the radial aerostatic bearings and the thrust aerostatic bearing allow an open impeller of the centrifugal compressor is allowed to use a smaller blade tip clearance and a smaller seal clearance than those in the prior art, so as to reduce vapor leakage of the centrifugal compressor and improve a performance of the centrifugal compressor.

Hence, the centrifugal compressor assembly 100 taught in the present invention resolves a problem that a common static pressure air bearing faces when a vapor refrigerant is used to provide vapor supply in a refrigeration compressor, that is, when a bearing temperature or a motor temperature is lower than a vapor supply temperature, the refrigerant is cooled to form a liquid, causing the aerostatic bearing to fail. The present invention uses porous aerostatic bearings that use a two-phase fluid. Therefore, no matter vapor supply of the bearings provides a vapor, a liquid, or vapor and liquid, the centrifugal compressor can safely rotate at a high speed, and vaporization of a liquid in the bearings improves bearing capacities of the bearings and cools the bearings and the rotor of the compressor.

The order of the foregoing embodiments is used for description only, and cannot be considered as a criterion for evaluating the embodiments. Finally, it should be noted that the foregoing embodiments are merely intended to describe the technical solutions of the present invention, rather than limit same. Although the present invention is described in detail with reference to the aforementioned embodiments, it should be understood by a person of ordinary skill in the art that: a person of ordinary skill in the art can make modifications to the technical solutions recorded in the aforementioned embodiments, or equivalent replacements to some technical features thereof, and the modifications or replacements would not enable the essence of the corresponding technical solution to be departed from the spirit and scope of the technical solutions of the embodiments of the present invention.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A centrifugal compressor assembly, comprising:
   a first stage compressor,
   a motor operatively connected to the first stage compressor, the motor configured to actuate the first stage compressor, the motor comprising a rotor configured to be displaced both rotatably and axially,
   a radial aerostatic bearing configured to help stabilize a rotational displacement of the rotor;
   a thrust aerostatic bearing to help stabilize the axial displacement of the rotor;
   wherein the motor comprises a motor housing and a radial bearing block, wherein the motor housing comprises an end cover portion and a housing portion defined by a cylindrical shape, wherein the rotor is rotatably disposed in the motor housing,
   wherein the radial bearing block is configured to fasten to a right end of the housing portion, the radial bearing block further configured to seal an opening at the right end of the housing portion,
   wherein the radial bearing block comprises a right through hole disposed along a left-to-right direction, wherein the right through hole of the radial bearing block comprises an inner wall surface having a right vapor-liquid groove, wherein the right through hole accommodates a right porous bushing of a right portion of the radial aerostatic bearing, wherein the rotor comprises a right end disposed in the right porous bushing,
   wherein the radial bearing block comprises a right vapor channel formed via disposing the right porous bushing into the right through hole, the right vapor channel configured to be in communication with the right vapor-liquid groove,
   wherein the end cover portion comprises a left through hole disposed along a left-to-right direction, wherein the left through hole of the end cover portion comprises an inner wall surface having a left vapor-liquid groove, wherein the left through hole accommodates a left porous bushing of a left portion of the radial aerostatic bearing, wherein a left end of the rotor is disposed in the left porous bushing, wherein the left end of the rotor is further supported on the end cover portion with the thrust aerostatic bearing, wherein the radial bearing block further comprises a left vapor channel formed via disposing the left porous bushing into the left through hole, the left vapor channel configured to be in communication with the left vapor-liquid groove, wherein the motor further comprises a stator, the stator disposed between the rotor and the housing portion, the stator comprising a lamination and a coil, the coil configured to be wound on the lamination, wherein the housing portion comprises an annular groove on an inner wall surface of the housing portion, wherein an axis of the annular groove coincides with an axis of the housing portion, wherein a width of a left-to-right direction of the lamination is greater than a width of a left-to-right direction of the annular groove, wherein the lamination is installed on the inner wall surface of the housing portion, and covers the annular groove, so as to form a cavity between the lamination and the inner wall surface of the housing portion, wherein the housing portion comprises an inlet channel, the inlet channel configured to provide a low-viscous two-phase fluid to enter and an outlet channel, such that the low-viscous two-phase fluid can be discharged, wherein the inlet channel is in communication with the annular groove, wherein the housing portion further comprises a left cooling channel and a right cooling channel, wherein one end of the left cooling channel is in communication with the inlet channel, and another end of the left cooling channel is in communication with an accommodation space at a left side of the stator, wherein one end of the right cooling channel is in communication with the inlet channel, and wherein another end of the right cooling channel is in communication with an accommodation space at a right side of the stator, wherein the left portion of the radial aerostatic bearing, the right portion of the radial aerostatic bearing, and the thrust aerostatic bearing comprise a porous material aerostatic bearing configured to use the low-viscous vapor-liquid two-phase fluid as a lubricating medium, wherein the thrust aerostatic bearing comprises two thrust bearings, an adjustment ring, and a thrust disc, wherein each of the thrust bearings comprises a disc seat and a porous ring, wherein each of the disc seats comprises an accommodation groove, and the corresponding porous ring is disposed in the accommodation groove, wherein each of the porous rings comprises a fluid channel, wherein each of the disc seats comprises a disc seat vapor channel, wherein the disc seat vapor channel is in communication with the corresponding fluid channel, wherein the porous rings of the two thrust bearings are face-to-face disposed, wherein the adjustment ring is located between the disc seats of the two thrust bearings, and wherein the thrust disc is fastened to the rotor and is located between the porous material rings of the two thrust bearings, the low-viscous vapor-liquid two-phase fluid configured to at least partially lubricate the radial aerostatic bearing and the thrust aerostatic bearing;

a second stage compressor, wherein the motor actuates the second stage compressor, wherein the motor is a dual-output motor;

wherein the first stage compressor comprises a first volute and a first impeller, and the second stage compressor comprises a second volute and a second impeller, wherein the first volute is fastened to the end cover portion and is located at a left side of the end cover portion, wherein the first impeller is fastened to the left end of the rotor and is positioned in the first volute, wherein the second volute is fastened to the radial bearing block and is located at a right side of the radial bearing block, and wherein the second impeller is fastened to the right end of the rotor of the motor and is located in the second volute, wherein the first impeller and the second impeller are open impellers, wherein there is a clearance of less than 100 μm between a blade tip of the first impeller and the first volute; and wherein there is a clearance of less than 100 μm between a blade tip of the second impeller and the second volute.

* * * * *